United States Patent [19]

Hall, Jr.

[11] Patent Number: 5,715,641
[45] Date of Patent: Feb. 10, 1998

[54] MODULAR WALL PANEL FOR TOWABLE TRAILERS

[75] Inventor: Roland K. Hall, Jr., Bokchito, Okla.

[73] Assignee: Sundowner Trailers, Inc., Coleman, Okla.

[21] Appl. No.: 741,813

[22] Filed: Oct. 31, 1996

[51] Int. Cl.$^6$ .................................................. E04B 2/00
[52] U.S. Cl. .................. 52/578; 52/588.1; 52/591.1; 52/508; 52/537
[58] Field of Search .................. 52/519, 526, 506.1, 52/508, 537, 783.11, 578, 588.1, 586.1, 586.2, 589.1, 590.2, 591.1, 554; 428/156, 157, 163, 167, 177, 179

[56] References Cited

U.S. PATENT DOCUMENTS

| | | | |
|---|---|---|---|
| 2,323,417 | 7/1943 | Pauli, Jr. | 52/591.1 |
| 2,740,167 | 4/1956 | Rowley | 52/591.1 |
| 3,110,371 | 11/1963 | De Riddor | 52/588.1 |
| 3,188,131 | 6/1965 | Attwood | 52/537 X |
| 4,358,916 | 11/1982 | Lacasse | 52/537 X |
| 4,819,398 | 4/1989 | Damrron | 52/588.1 X |
| 5,020,293 | 6/1991 | Itagaki | 52/508 X |
| 5,140,913 | 8/1992 | Takeichi et al. | 52/578 X |
| 5,165,213 | 11/1992 | Finch et al. | 52/588.1 |

Primary Examiner—Wynn E. Wood
Attorney, Agent, or Firm—Baker & Daniels

[57] ABSTRACT

An improved modular wall panel system for enclosing towable trailers such as horse trailers and livestock trailers, but equally applicable to recreational vehicles. The present system includes at least two elongated wall panels that are attached to the frame of the trailer in adjacent side by side relationship with their edges cooperating to define a seam therebetween. The panels are typically constructed of extruded aluminum, and have a pair of ends and elongated top and bottom edges extending between said ends. The top edge of the lower panel includes a longitudinally extending top lip which includes a longitudinal groove, and the bottom edge of the higher adjacent panel includes a downwardly extending bottom lip extending along the bottom edge and includes a bottom groove. The top and bottom edges include a series of abutment surfaces that cooperate to align the adjacent panels. The top lip groove and the bottom lip groove cooperating to define an enclosed longitudinal channel extending along said seam. The channel breaks the vacuum along the seam that causes water leakage.

10 Claims, 4 Drawing Sheets

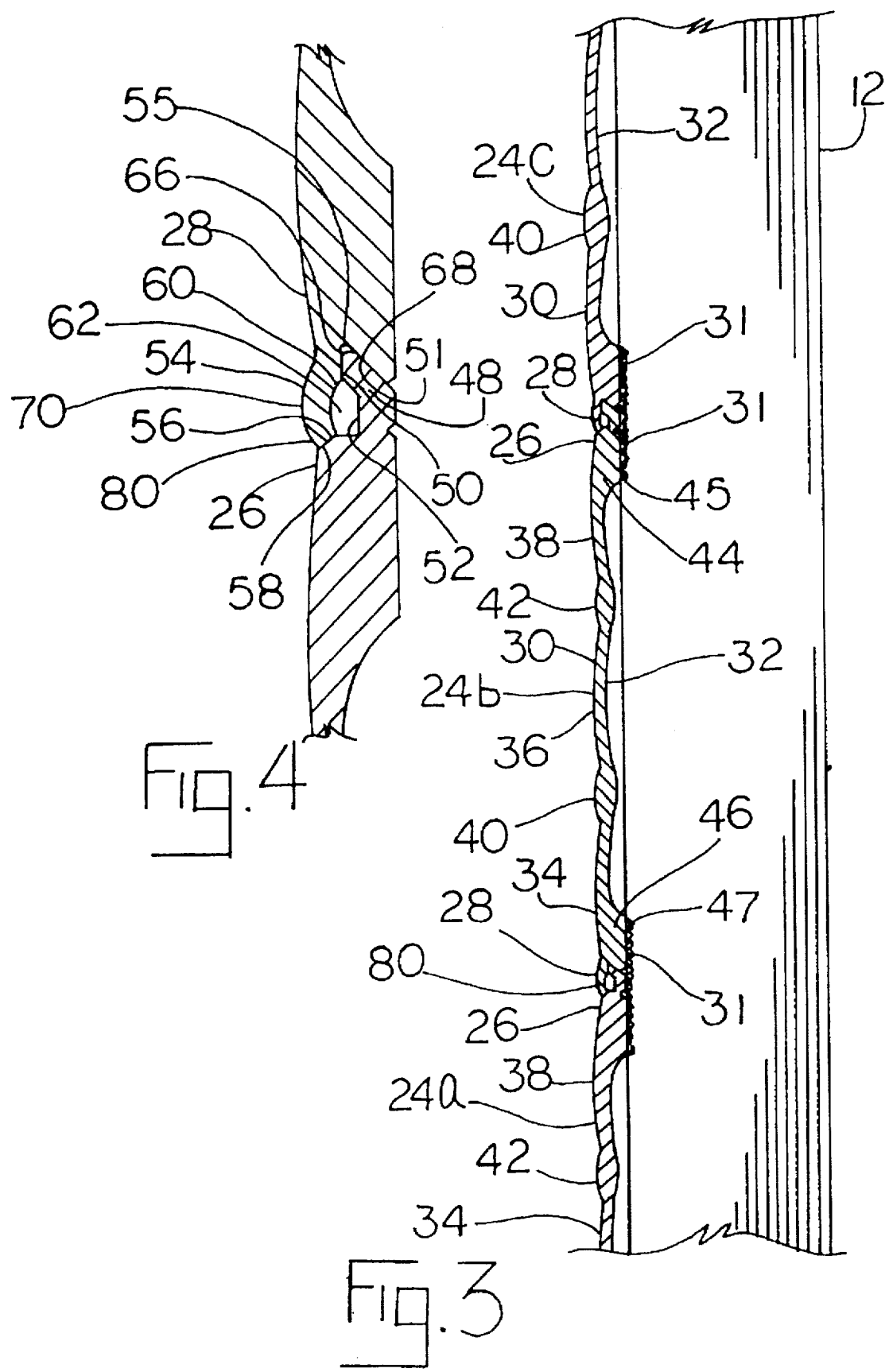

MODULAR WALL PANEL FOR TOWABLE TRAILERS

The present invention relates generally to an improved interlocking modular wall panel for towable vehicles such as horse trailers.

BACKGROUND OF THE INVENTION

Trailers for horses and other large animals are generally well known in the art. Because many of these trailers are designed to carry the heavy load of two, four, six or more horses at a time, the floor, frame, and enclosing walls of the trailers must be strong and stiff. Also, the structural components must be able to withstand the corrosive effect of manure and other waste products, as well as repeated washings with harsh detergent and acids.

Many manufactures now use floor, frame, and door components manufactured from aluminum instead of the more traditional steel. Aluminum offers a number of distinct advantages over steel materials. First, aluminum is significantly lighter than steel, and therefore an aluminum trailer is lighter and thus more fuel efficient. Aluminum offers the additional advantage of being resistant to the corrosive effects of the animal waste products, detergents and acids referred to above. Finally, aluminum is extrudable, which gives designers a great deal of flexibility to create complex cross-sections, and allows manufacturers to mass produce structural components quickly and economically.

Some trailer manufactures also use aluminum side slats or wall panels to enclose their trailers. In a typical application the side panels are welded or otherwise attached to the frame of the trailer much like siding is attached to a house. Unfortunately, the welding process creates unsightly deformations on the outside of the trailer, which greatly detracts from the overall appearance. One solution to this problem has been to use a side panel that has a horizontally extending attachment leg or ledge along its upper and lower edges which is welded to the frame of the trailer. Although this approach minimizes the amount of deformation on the outer surface, it unfortunately creates a number of other problems. Foremost among these problems is the fact that the ledge creates a collection point for dirt, debris, waste products and the corrosive acids used to clean the interior of the trailer.

Another problem with prior art aluminum wall panels is at the connection between adjacent panels. Typically, each panel includes a lip or extension depending from its lower edge which is received in a channel or similar formation along the top edge of the lower adjacent wall panel. Thus, the joints between adjacent panels typically provide another collection point for the dirt, debris and other products referred to above.

One final problem with prior art wall panels is water leakage. When two pieces of wood, metal or aluminum are placed together a slight vacuum is formed along the seam between the members. This small vacuum tends to suck water into the joint between the members in a process known as capillary action. In order to prevent capillary action, caulks, gaskets, sealants or other means must be used to seal the joint, which increases the labor and materials needed to assemble the trailer.

Accordingly, there exists a need for an improved aluminum wall panel for trailers that can be welded or otherwise secured to the trailer frame without deforming the outer surface of the wall panel. There also exists a need for a modular wall panel that has an improved interlocking seam between adjacent panels that eliminates the water leakage caused by capillary action, and that eliminates collection points for dirt, debris, and other corrosion causing materials.

SUMMARY OF THE INVENTION

The modular wall panel according to the present invention has edges that interlock with the edges of adjacent panels to form a seal at the seam between adjacent panels. The wall panels of the present invention are self aligning to ease assembly, and the interlocking edges form an internal chamber in the middle of the seam that breaks or interrupts the vacuum that causes capillary action, thus preventing the ingress of water. The improved wall panel of the present invention also includes a stiffened reinforcing portion along its top and bottom edges that permits the wall panels to be welded directly to the frame of the trailer without creating unsightly deformations on the outer surface of the panels without using debris collecting attachment legs. The reinforcing portions of adjacent panels cooperate to define a smooth inwardly facing attachment surface along the seams between adjacent panels. The wall panel of the present invention also includes ribbed or fluted exterior which increases the stiffness of each panel and also presents a pleasing and ornamental outer surface.

The lower edge of each panel includes an offset V-shaped groove which receives an offset angled lip along the top edge of the lower adjacent panel. The lip engages the inside edge of the V in order to automatically align and interlock the adjacent panels. Both the V-shaped groove and the offset lip include an inwardly facing groove, which cooperate to form a hollow channel or void along the seam between the adjacent panels. The void interrupts the capillary action discussed above, thus preventing water from traveling through the seams between adjacent panels.

The upper and lower edges of each wall panel also include a thickened attachment portion having a flat inwardly facing welding surface along each of the top and bottom edges. Because of the thickened attachment portion, the wall panels can be welded directly to the trailer frame without causing unsightly deformations on the outer surface. Finally, each wall panel also includes a series of convex bulges or flutes separated by reinforcing ribs extending along the length of the panels which increase the strength and stiffness of each panel while only slightly increasing the weight of each panel.

Accordingly, it is an object of this invention to provide an improved modular wall panel for towable trailers.

Another object of this invention is to provide a modular wall panel that has an improved interlocking seam or joint between adjacent panels that is self-aligning, easy to assembly, and which prevents the ingress of water.

A further object of this invention is to provide a modular wall panel having an elongated internal channel at the seam between adjacent panels that interrupts capillary action.

A still further object of this invention is to provide a modular wall panel that can be welded directly to the supporting framework without deforming the outer surface of the panel.

These and other objects of the invention will become readily apparent to those skilled in the art upon a reading of the following description, with reference being had to the accompanying drawings.

BRIEF DESCRIPTION OF THE DRAWINGS

FIG. 3 is an enlarged fragmentary cross sectional view taken substantially along lines 3—3 of FIG. 1, illustrating a number of interlocking modular wall panels attached to the frame of the trailer, with the edges of each wall panel engaging the edges of the adjacent panels;

FIG. 4 is an enlarged fragmentary cross sectional view of the seam between adjacent panels showing the top lip and the bottom lip cooperating to define an internal channel.

DETAILED DESCRIPTION OF THE INVENTION

The embodiment herein described is not intended to be exhaustive or to limit the invention to the precise form disclosed. It is chosen and described to explain the principles of the invention and its application and practical use to best enable others skilled in the art to follow its teachings.

Figure 1:
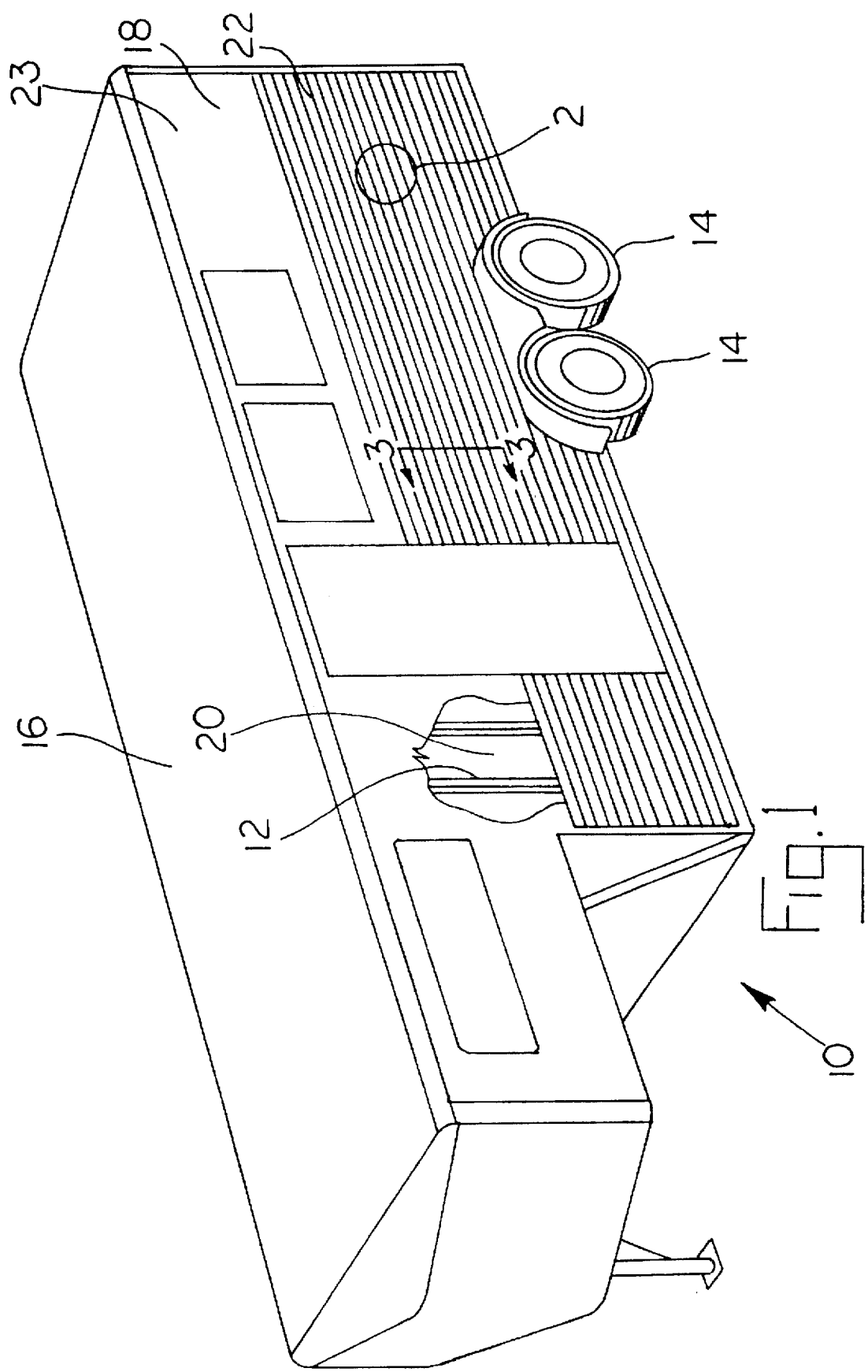
FIG. 1 is a perspective view of a towable horse trailer incorporating the modular wall panels of the present invention.

Referring now to the drawings, an enclosed towable horse trailer having the modular wall panel system according to the present invention is generally indicated by the reference numeral 10. Trailer 10 includes a frame 12 and a set of wheels 14. Trailer 10 also includes a roof 16 and a plurality of walls 18 which enclose an interior space 20. As shown in FIG. 1, the modular wall system according to the present invention is generally indicated by the reference numeral 22. In the embodiment shown, wall system 22 encloses a portion of trailer 10, with the remaining portion of trailer 10 being enclosed by more conventional siding 23. Alternatively, wall system 22 may enclose a greater or lesser percentage of trailer 10 than that shown in FIG. 1 in order to achieve a variety of ornamental effects.

Figure 2:
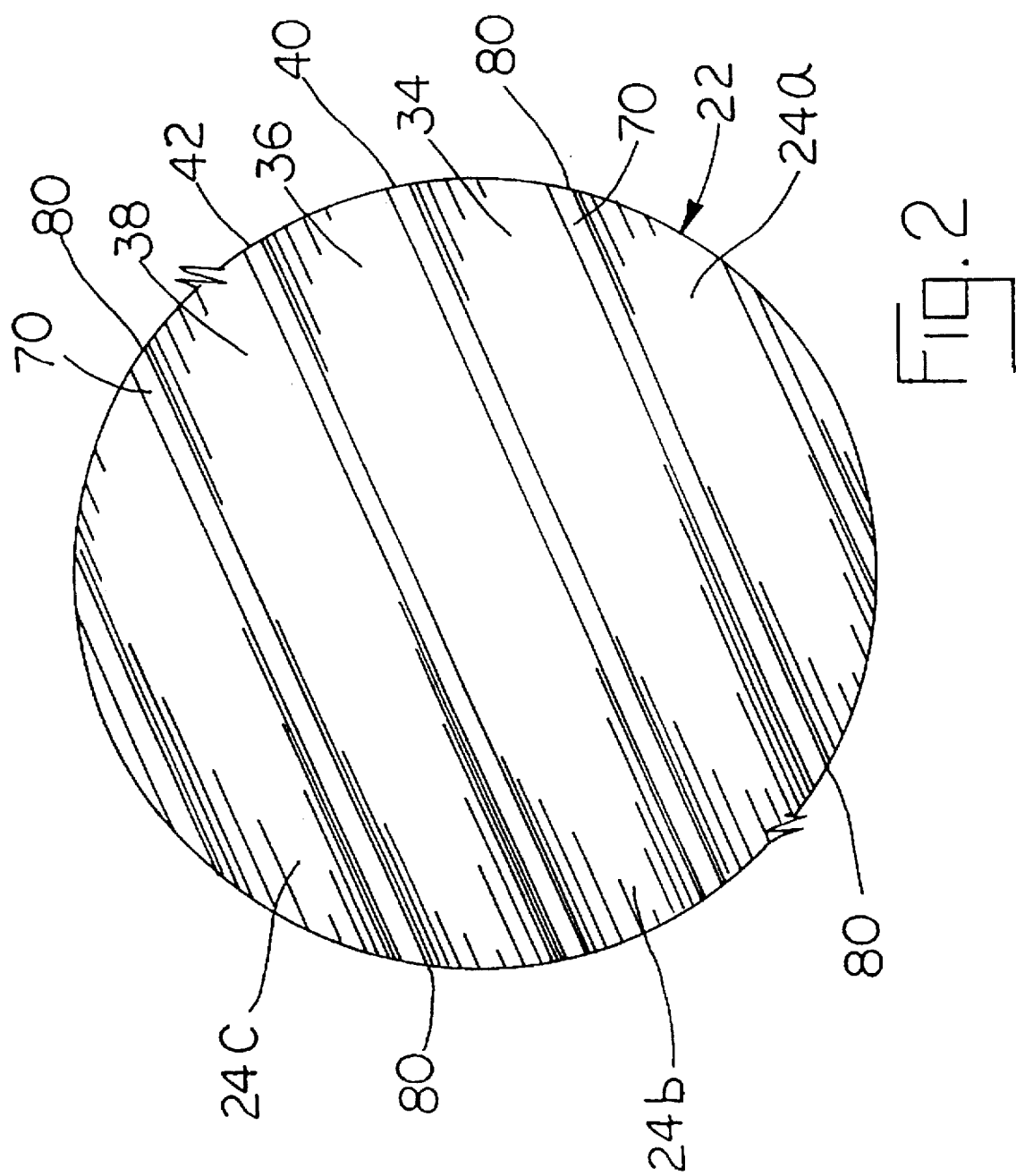
FIG. 2 is an enlarged view of the circumscribed portion of FIG. 1, illustrating the modular wall panels of the present invention, including the fluted outer surface and the longitudinal reinforcing ribs.
Figure 5:
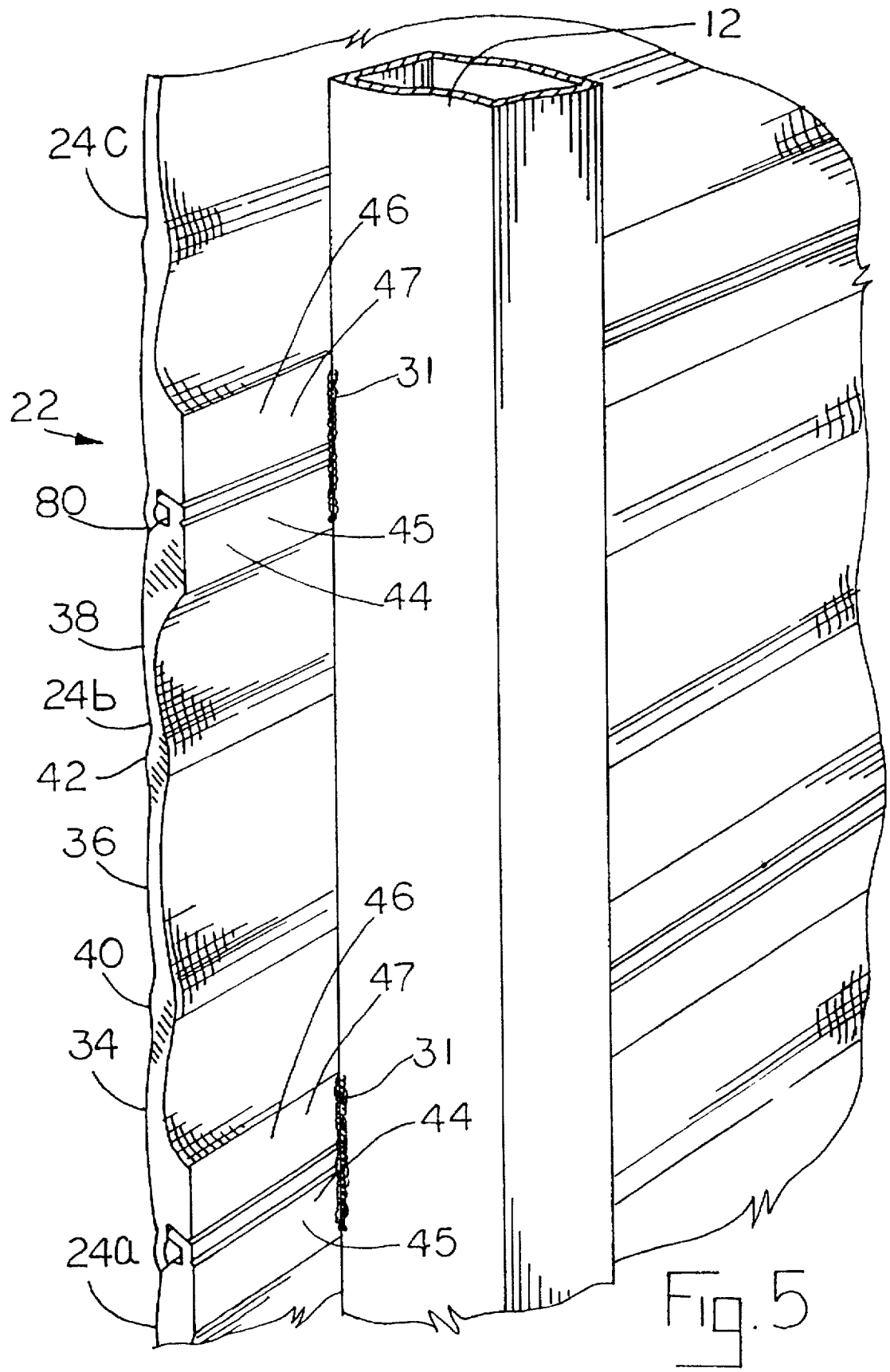
FIG. 5 is fragmentary view in perspective taken from inside the trailer of FIG. 1 showing the manner of securing the wall panels to the trailer frame.

As shown in FIGS. 2 and 3, a plurality of wall panels 24a, 24b and 24c are shown attached to frame 12. Each panel 24 includes a top edge 26 and a bottom edge 28, and also includes an outer surface 30 and an inner surface 32. Outer surface 30 includes three convex portions 34, 36 and 38, which are separated by a pair of reinforcing ribs 40, 42. Convex portions 34, 36 and 38 along with reinforcing ribs 40, 42 increase the flexural rigidity of panels 24 and also give the outer surface 30 of panels 24 a distinctive fluted appearance. Each top edge 26 includes a thickened attachment portion 44 having a substantially flat inwardly facing surface 45, while each bottom edge includes a thickened attachment portion 46 having a substantially flat inwardly facing surface 47. Surfaces 45 and 47 cooperate to define a substantially flat attachment surface along the inner surface of seam 80. As shown in FIGS. 3 and 5, panels 24a, 24b, and 24c are attached to frame 12 by a plurality of fillet welds 31 along surfaces 45 and 47.

As shown in FIG. 4, each top edge 26 includes an upwardly extending top lip 48 having abutment surfaces 50, 51. Top edge 26 further includes a longitudinal groove 52 and an angled shoulder 58 extending along the length of panel 24. Each bottom edge 28 defines an inverted "V" shaped groove 55 having a pair of abutment surfaces 66 and 68. Bottom edge 28 also includes a downwardly depending lip 54 having an angled abutment surface 56, which contacts angled shoulder 58 on top edge 26. Bottom lip 54 includes a longitudinal groove 60 extending along the length of panel 24, and top lip groove 52 and bottom lip groove 60 cooperate to define a longitudinal void or channel 62. Bottom lip 54 preferably includes a curved outer surface 70 which is shaped to match the shape of reinforcing ribs 40, 42, in order to give the wall panel system 22 a pleasing and uniform outer appearance as shown in FIG. 2. The angles of surface 56 and shoulder 58 are complementary, so that a smooth interface is defined therebetween. Similarly, the angle between surfaces 50 and 51 of top lip 48 is the same as the angle between surfaces 66 and 68 of bottom lip 54. Thus, surface 56 abuts surface 58, surface 50 abuts surface 66 and surface 51 abuts surface 68, so that each panel 24 aligns properly with its adjacent panels along seam 80 as shown in FIG. 4.

In operation, the wall system 22 is assembled by first securing the bottom edge 28 of panel 24a to frame 12 by applying a fillet weld 31. Wall panel 24b is then positioned above and immediately adjacent to panel 24a, so that bottom lip 54 and top lip 48 cooperate to define the seam 80. Abutment surfaces 50, 51 contact surfaces 66, 68 as discussed above, and surface 56 contacts surface 58, thus aligning the adjacent panels, and thus creating channel 62. Panels 24a and 24b are then secured to the frame 12 by applying the fillet welds 31 referred to above across seam 80 and along surfaces 45, 47 of thickened attachment portions 44, 46. Preferably, the interface between surfaces 56 and 58 slopes upward from outer surface 30, while the interface between surfaces 51, 68 preferably slopes upward from inner surface 32, thus minimizing the chances that dirt, debris, or other contaminants will collect at seam 80. The top edge 26 of panel 24b and the bottom edge 28 of panel 24c are welded to frame 12 in the same manner. The process is then repeated with each additional panel 24 as necessary.

When either the outer surface 30 or the inner surface 32 is wet, the surface tension of the water (not shown) tends to create a vacuum along seam 80. Without channel 62, the vacuum would gradually pull water between surfaces 56 and 58, 50 and 66, and 51 and 68, and thus water would penetrate seam 80. However, because the surface tension induced vacuum is relatively small, the vacuum cannot be sustained within channel 62, and thus the vacuum is effectively broken.

It will be appreciated that the foregoing is presented by way of illustration only, and not by way of any limitation, and that various alternatives and modifications may be made to the illustrated embodiment without departing from the spirit and scope of the invention.

What is claimed:

1. In combination, a towable trailer and a wall system enclosing the towable trailer, the trailer having a frame, said system comprising:

first and second elongated panels for placement generally adjacent each other and attached to the frame, each of said panels including an inwardly facing surface engaging the frame and an opposite outwardly facing surface;

each of said panels having a pair of ends and elongated top and bottom edges extending between said ends, said first panel top edge abutting said second panel bottom edge to define a seam therebetween;

an upwardly extending top lip extending along said first panel top edge, said top lip including a longitudinal groove; and a downwardly extending bottom lip extending along said second panel bottom edge, said bottom lip including a longitudinal groove, said bottom lip being displaced from said top lip, said top lip groove facing the bottom lip groove whereby said top lip groove and said bottom lip groove cooperate to define an enclosed longitudinal channel extending along said seam.

2. The system of claim 1, wherein said first member top edge includes a shoulder for receiving said second member bottom lip, and wherein a portion of said second member bottom lip defines a slot for receiving said first member top lip.

3. The system of claim 1, wherein said outer surface includes at least one outwardly projecting convex section extending between said top and bottom edges between said ends.

4. The system of claim 1, wherein said outer surface includes at least two outwardly projecting convex sections extending between said top and bottom edges between said ends.

5. The system of claim 4, wherein said outer surface further includes a longitudinal reinforcing rib separating each of said convex sections.

6. In combination, a towable trailer and a wall system for enclosing a towable trailer, the trailer having a frame, said system comprising:

first and second elongated panels for placement generally adjacent each other and attached to the frame, each of said panels including an inwardly lacing surface engaging the frame and an opposite outwardly facing surface;

each of said panels having a pair of ends and elongated top and bottom edges extending between said ends, said first panel top edge abutting said second panel bottom edge to define a seam therebetween;

an upwardly extending top lip extending along said first panel top edge, said top lip including a longitudinal groove; and a downwardly extending bottom lip extending along said second panel bottom edge, said bottom lip including a longitudinal groove, said top lip groove and said bottom lip groove cooperating to define an enclosed longitudinal channel extending along said seam, each of said panels including a wall portion, and said panel top and bottom edges includes an attachment portion for attaching said panels to the frame, said attachment portion being thicker than said wall portion.

7. The system of claim 6, wherein said attachment portion of said first panel top edge and said attachment portion of said second panel bottom edge cooperate to define a substantially flat inwardly facing attachment surface extending along said seam.

8. In combination, a towable trailer and a wall system for enclosing a towable trailer, the trailer having a frame, said system comprising:

first and second elongated panels for placement generally adjacent each other and attached to the frame, each of said panels including an inwardly facing surface engaging the frame and an opposite outwardly facing surface;

each of said panels having a pair of ends and elongated top and bottom edges extending between said ends, said first panel top edge abutting said second panel bottom edge to define a seam therebetween;

an upwardly extending top lip extending along said first panel top edge, said top lip including a longitudinal groove; and a downwardly extending bottom lip extending along said second panel bottom edge, said bottom lip including a longitudinal groove, said top lip groove and said bottom lip groove cooperating to define an enclosed longitudinal channel extending along said seam, said first member top edge including a shoulder for receiving said second member bottom lip, and wherein a portion of said second member bottom lip defines a slot for receiving said first member top lip, said top lip including a pair of top abutment surfaces and said slot includes a pair of bottom abutment surfaces for mating with said top abutment surfaces, and wherein said bottom lip includes an abutment surface for mating with said shoulder, so that said first and second panels lie generally parallel with the frame and aligned with each other.

9. The system of claim 8, wherein the interface between said bottom lip and said shoulder slopes downwardly towards said outer surface.

10. The system of claim 8, wherein the interface between one of said top abutment surfaces and one of said bottom abutment surfaces slopes downwardly towards said inner surface.

* * * * *